Patented Mar. 3, 1936

2,032,627

UNITED STATES PATENT OFFICE 2,032,627

WATER-INSOLUBLE AZODYESTUFFS

Friedrich Muth, Leverkusen-I. G. Werk, Germany, assignor to General Aniline Works, Inc., New York, N. Y., a corporation of Delaware No Drawing. Application October 22, 1932, Serial No. 639,153. In Germany October 26, 1931

7 Claims. (Cl. 260—46.1)

The present invention relates to new water-insoluble azodyestuffs, more particularly it relates to dyestuffs which may be represented by the probable general formula:

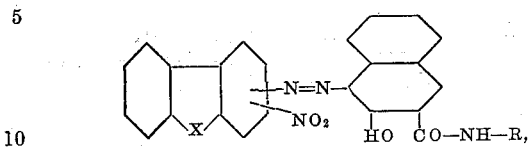

wherein X stands for NH, the hydrogen atom of which may be substituted by a hydrocarbon radical, S, SO, $SO_2$, O, $CH_2$ or CO, wherein R stands for a radical of the aromatic series, the $NO_2$-group stands in o-position to the azo group and wherein the nuclei may be further substituted by substituents which do not cause solubility in water, such as alkyl, alkoxy, aryloxy, aralkyloxy, halogen, the nitro group, acylamino, a sulfoneamide group one or both hydrogen atoms of which are substituted by hydrocarbon radicals, sulfonealkyl, sulfonearalkyl, sulfonearyl, an alkyl ketone or aryl ketone group; as substituents there may be mentioned by way of example methyl, ethyl, propyl, isobutyl, methoxy, amyl, benzyl, methoxybenzyl, chlorobenzyl, phenyl chlorophenyl, tolyl, anisyl, ethoxy, phenoxy, p-chlorophenoxy, benzyloxy, p-nitrobenzyloxy, chlorine, bromine, acetylamino, benzoylamino, mono- or dimethylsulfoneamide, methyl-ethyl-sulfoneamide, phenylsulfoneamide, ethylphenylsulfoneamide, benzylsulfoneamide and the methylketone or ethylketone group.

As diazotization components suitable for the manufacture of the new dyestuffs there may be mentioned amino-diphenylene compounds, such as 2-amino-3-nitrodiphenyleneoxide, 3-amino-2-nitrodiphenyleneoxide, 1-amino-2-nitrodiphenyleneoxide, 2-amino-3-nitro-6-bromodiphenyleneoxide, 2-amino-3,7-dinitrodiphenyleneoxide, 2-amino-3-nitro-6-sulfodiethylamidodiphenyleneoxide, 2-amino-3-nitro-6-ethylsulfoneoxide, 2-amino-3-nitro-7-methoxydiphenyleneoxide, 1-methyl-2-amino-3-nitrodiphenyleneoxide, 3-amino-2-nitrocarbazole, 3-amino-4-nitrocarbazole, 2-amino-3-nitrocarbazole, 1-amino-2-nitrocarbazole, 3-amino-2-nitro-6-chlorocarbazole, 2-amino-3-nitro-7-sulfodimethylaminocarbazole, 3-amino-2-nitro-6-methoxycarbazole, 3-amino-2.6-dinitrocarbazole, 3-amino-2-nitro-7-methylketonecarbazole, 3-amino-2-nitro-9-methylcarbazole, 3-amino-4-nitro-9-ethylcarbazole, 2-amino-3-nitro-9-benzylcarbazole, 9-phenyl-3-amino-2-nitro-6-chlorocarbazole, 2-amino-3-nitro-7-bromofluorenone, 2-amino-3,7-dinitrofluorenone, 2-amino-3-nitro-7-bromofluorene, 2-amino-3-nitro-7-bromodiphenylenesulfide, 2-amino-3-nitro-7-sulfodiethylaminodiphenylenesulfide, 2-amino-3-nitro-7-bromodiphenylenesulfone, 2-amino-3-nitro-7-sulfodiethylaminodiphenylenesulfone.

As coupling components there may be used the 2-hydroxy-3-naphthoic acid arylamides generally used in the manufacture of ice colors.

My new dyestuffs are obtainable by diazotizing in the usual manner an ortho-nitramine compound of the kind referred to above and coupling in substance or on the fibre with a 2,3-hydroxynaphthoic acid arylamide.

The shades produced on the fibre somewhat depend on the specific components used; as a general rule, however, there may be stated that the azodyestuffs produced with an ortho-nitramino-diphenyleneoxide generally yield bluish-red to Bordeaux shades, the dyestuffs produced with an ortho-nitramino-carbazole generally yield violet to corinth shades, the dyestuffs produced with an ortho-nitroamino-fluorenone generally yield dull red shades, the dyestuffs produced with an ortho-nitraminofluorene generally yield Bordeaux shades, the dyestuffs produced with ortho-nitramino-diphenyleneoxide generally yield Bordeaux shades and the dyestuffs produced with an ortho-nitramino-diphenylenesulfide or -sulfone generally yield red to orange-red shades.

The diazotization components used in my invention generally are obtainable by starting with the corresponding amine, diacetylating the amino group, and splitting off the acetyl groups by saponification.

The invention is illustrated by the following examples, without being limited thereto:

Example 1.—4 g. of 1-(2',3'-hydroxynaphthoylamino)-2,4-dimethoxy-5-chlorobenzene, 8 ccs. of Turkey red oil (50%) and 8 ccs. of caustic soda lye (34° Bé.) are made into a paste and dissolved to a clear solution by the addition of 200 ccs. of hot water, while boiling. After cooling to a temperature of about 50° C., 4 ccs. of a solution of formaldehyde (33%) are added and then the solution is diluted to 1000 ccs. with the aid of cold water. In this solution 50 g. of cotton are grounded for ½ hour at a temperature of about 30° C. Then the cotton is squeezed and developed in 1000 ccs. of a solution containing 2.3 g. of diazotized o-nitro-2-aminodiphenyleneoxide (prepared according to "Borsche, Berichte der Deutschen Chemischen Gesellschaft, vol 56, 1928, page 2504") and 2.8 g. of aluminum sulfate. After rinsing and soaping, while boiling, Bordeaux shades of good fastness to light and boiling in aqueous caustic soda are obtained. The dyestuff corresponds to the following formula:

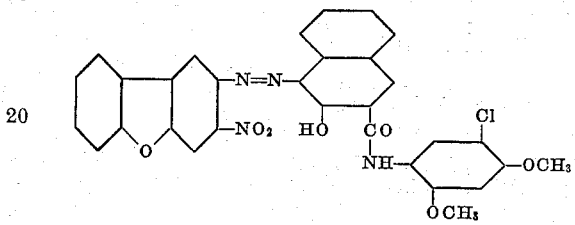

In an analogous manner there is obtained from 2-(2',3'-hydroxynaphthoylamino)-naphthalene a bluish-red of good fastness to light and boiling in aqueous caustic soda.

Compared with the amines not containing the nitro group, the dyestuffs thus obtained exert an improved fastness to light, and further, it is surprising that in spite of the nitro group in o-position to the azo group the fastness to boiling in aqueous caustic soda is not deteriorated.

*Example 2.*—5 g. of 1-(2',3'-hydroxynaphthoylamino)-2-methyl-4-methoxybenzene, 8 ccs. of Turkey red oil (50%) and 8 ccs. of caustic soda lye (34° Bé.) are made into a paste and dissolved to a clear solution with 75 ccs. of hot water, while boiling. By the addition of 75 ccs. of cold water the solution is cooled to a temperature of about 50° C., and 2.5 ccs. of a solution of formaldehyde (33%) are added. After 5 minutes the solution is diluted with cold water to 1000 ccs. and 50 g. of cotton are grounded in the usual manner. Then the cotton is squeezed and developed in a solution containing 2.3 g. of diazotized 2-nitro-3-aminocarbazole (prepared according to "Kehrmann and Zweifel, Helvetia Chimica Acta, Vol XI, p. 1213 seq.) and 2.8 g. of aluminum sulfate. After acidifying, rinsing and soaping, a corinth is obtained which exerts good fastness to light and boiling in aqueous caustic soda. The dyestuff corresponds to the following formula:

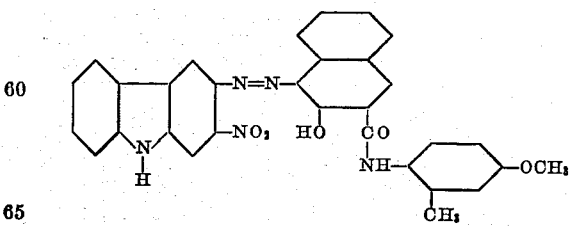

In an analogous manner there is obtained from 1-(2',3'-hydroxynaphthoylamino)-2-methyl-4-chlorobenzene a corinth of good fastness to light and boiling in aqueous caustic soda, and from 2-(2',3'-hydroxynaphthoylamino)-naphthalene a bluish-violet exerting good fastness to light and boiling in aqueous caustic soda.

Compared with the amines not containing the nitro group, the dyestuffs thus obtained exert an improved fastness to light, and further, it is surprising that in spite of the nitro group in o-position to the azo group the fastness to boiling in aqueous caustic soda is not deteriorated.

In an analogous manner there is obtained: from 2-amino-3-nitrofluorenone and 1-(2',3'-hydroxynaphthoylamino)-4-methoxybenzene a brownish-red dyestuff of the following formula:

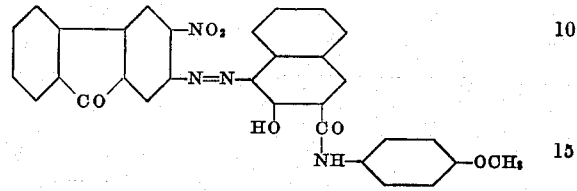

from 2-amino-3-nitrofluorenone and 1-(2',3'-hydroxynaphthoylamino)-3-nitrobenzene a brownish-red dyestuff of the following formula:

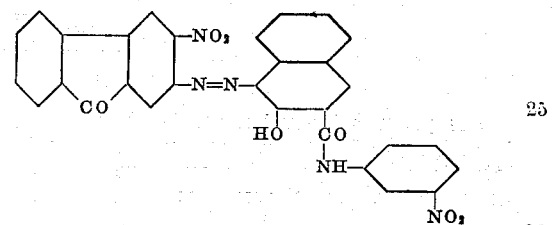

from 2-amino-3-nitrofluorene and 1-(2',3'-hydroxynaphthoylamino)-3-chloro-4,6-dimethoxybenzene a reddish-Bordeaux dyestuff of the following formula:

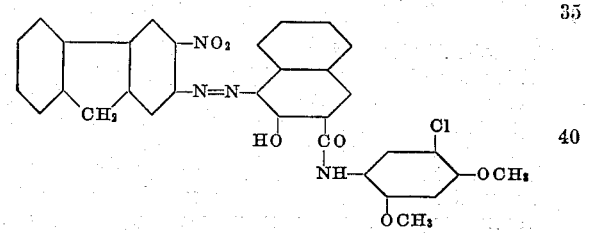

from 2-amino-3-nitrodiphenylenesulfide and 1-(2',3'-hydroxynaphthoylamino)-2-methyl-4-chlorobenzene a Bordeaux-red dyestuff of the following formula:

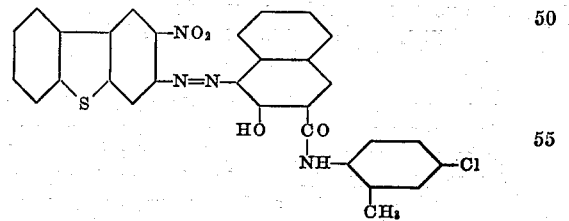

from 2-amino-3-nitrodiphenylenesulfide and 2-(2',3'-hydroxynaphthoylamino)-naphthalene a Bordeaux-red dyestuff of the following formula:

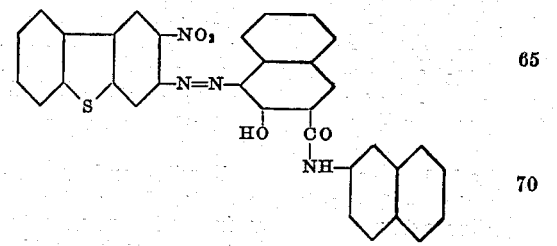

and from 2-amino-3-nitrodiphenylenesulfone and 1-(2',3'-hydroxynaphthoylamino)-2-methyl-4- chloro-benzene a reddish-orange dyestuff of the following formula:

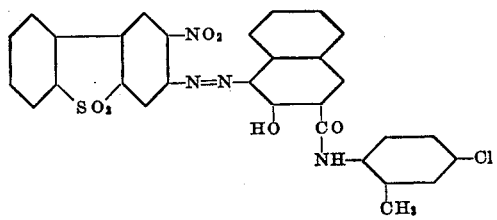

I claim:
1. Water insoluble azo dyes of the general formula:

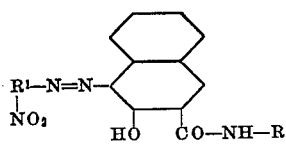

in which $R^1$ is a diphenylene radical, R is a radical of the aromatic series and the —$NO_2$ group stands in o-position to the azo group, said dyes yielding when produced on the fiber, generally corinth to orange-red shades of good fastness to light and to boiling in aqueous caustic soda.

2. The azodyestuffs of the general formula:

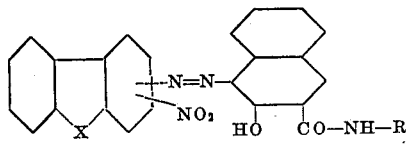

wherein X stands for a divalent radical of the group consisting of NH, the hydrogen atom of which may be substituted by a hydrocarbon radical, S, SO, $SO_2$, O, $CH_2$ and CO, wherein R stands for a radical of the aromatic series, the $NO_2$-group stands in o-position to the azo group, and wherein the nuclei may be further substituted by substituents selected from the group consisting of alkyl, alkoxy, aryloxy, aralkyloxy, halogen, the nitro group acylamino, a sulfoneamide group one or both hydrogen atoms of which are substituted by hydrocarbon radicals, sulfonealkyl, sulfonearalkyl, sulfonearyl, an alkyl ketone or aryl ketone, yielding, when produced on the fibre, generally corinth to orange-red shades of good fastness to light and boiling in aqueous caustic soda.

3. The azodyestuff of the following formula:

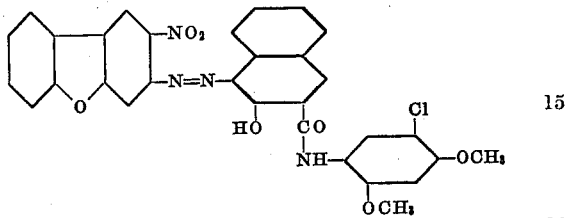

yielding, when produced on the fibre, a Bordeaux of excellent fastness to light and boiling in aqueous caustic soda.

4. The azodyestuff of the following formula:

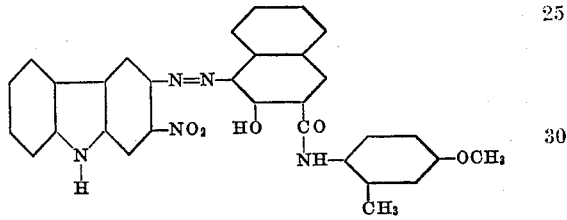

yielding, when produced on the fibre, a corinth of excellent fastness to light and boiling in aqueous caustic soda.

5. Fibre dyed with the dyestuffs as claimed in claim 2.
6. Fibre dyed with the dyestuff as claimed in claim 3.
7. Fibre dyed with the dyestuff as claimed in claim 4.

FRIEDRICH MUTH.